United States Patent [19]

Bullard et al.

[11] Patent Number: 5,141,368

[45] Date of Patent: Aug. 25, 1992

[54] AUTOMATED SIDE-DRILLED DEVICE AND METHOD FOR CATHETERS

[75] Inventors: Gary C. Bullard, Troi; William J. Gahara, Nashua, both of N.H.

[73] Assignee: Worldwide Medical Plastics Inc., Nashua, N.H.

[21] Appl. No.: 501,244

[22] Filed: Mar. 20, 1990

[51] Int. Cl.⁵ .............................................. B23B 35/00
[52] U.S. Cl. ..................................... 408/1 R; 408/71; 408/68; 408/704; 408/13
[58] Field of Search .................. 408/1 R, 3, 70, 71, 408/704, 35, 13, 68; 279/5; 409/221; 29/27 C, 33 T; 364/474.22, 474.28, 474.25; 51/56 R

[56] References Cited

U.S. PATENT DOCUMENTS

| | | | |
|---|---|---|---|
| 1,731,010 | 10/1929 | Krause et al. | 408/68 |
| 2,630,026 | 3/1953 | Monson | 408/35 X |
| 2,709,932 | 6/1955 | Grimes | 408/13 |
| 2,934,978 | 5/1960 | Estabrook | 408/13 |
| 3,077,799 | 2/1963 | Schwarze | 408/13 X |
| 3,293,442 | 12/1966 | Marantette et al. | 408/3 X |
| 3,400,615 | 9/1968 | Godlove et al. | 408/3 |
| 3,790,181 | 2/1974 | Scharfein | 279/5 X |
| 3,826,584 | 7/1974 | Mengeringhausen | 408/35 |
| 4,090,281 | 5/1978 | Hautau | 408/35 X |
| 4,512,380 | 4/1985 | Schmidt | 408/3 X |

FOREIGN PATENT DOCUMENTS

| | | | |
|---|---|---|---|
| 539459 | 7/1955 | Belgium | 408/13 |
| 3344824 | 6/1985 | Fed. Rep. of Germany | 29/27 C |
| 13279 | 2/1978 | Japan | 408/71 |
| 7809532 | 3/1980 | Netherlands | 408/68 |
| 780978 | 11/1980 | U.S.S.R. | 408/70 |
| 592 | of 1881 | United Kingdom | 408/70 |
| 842705 | 7/1960 | United Kingdom | 408/71 |
| 2044650 | 10/1980 | United Kingdom | 408/68 |

Primary Examiner—Steven C. Bishof
Assistant Examiner—Robert Schultz
Attorney, Agent, or Firm—St. Onge Steward Johnston & Reens

[57] ABSTRACT

A device and method are provided for side-drilling of catheters. The method comprises storing side-drilling hole patterns, selecting a side-drilling hole pattern, positioning the catheter at successive locations defined by the pattern, and drilling holes at the locations. The device carries out the method to side-drill catheters.

20 Claims, 8 Drawing Sheets

5,141,368

AUTOMATED SIDE-DRILLED DEVICE AND METHOD FOR CATHETERS

TECHNICAL FIELD

This invention relates to catheter side-drilling devices and methods and, more specifically, to devices and methods for automated side-drilling of catheters.

BACKGROUND ART

Prior art devices and methods for side-drilling of catheters generally comprise a hand-operated drill press and a stage or the like for mounting the catheter. The stage may be hand-manipulated to axially and rotationally adjust the catheter to side-drill a desired series of holes providing a pattern. Because the side-drilling of a pattern is accomplished entirely by hand, production is inefficient.

Particular side-drilled catheter hole patterns may be preferred for particular surgical procedures and the like. In this regard, a catheter side-drilling device which would produce catheters with precision patterns of holes, and with repeatable accuracy, is desired.

Holes are typically drilled with a solid bit which may produce either undesirable flashing, or blockage in the catheter. Thus, it would further be desirable to enable flashless side-drilling of catheters.

SUMMARY OF THE INVENTION

Accordingly, it is an object of this invention to provide a method and device for automated side-drilling of catheters. It is another object of this invention to provide a device for precisely side-drilling patterns of holes in catheters. It is still another object of this invention to provide a device for side-drilling patterns of holes in catheters with repeatable accuracy. It is yet another object of this invention to provide a device for flashlessly side-drilling catheters.

This invention relates to a device for automated side-drilling of catheters. The device comprises means for storing side-drilling hole patterns, means for selecting a desired pattern, means for positioning the catheters at successive locations defined by the pattern, and means for drilling holes at the locations. Preferably, the positioning means comprises means for axially moving the catheter and means for rotating the catheter. Preferably, also, the drilling means comprises a hollow drill bit which provides a clean relatively flashless hole in the catheter by boring a plug therefrom.

In another aspect, this invention relates to a method for side-drilling of catheters. The method comprises storing side-drilling hole patterns, selecting a side-drilling hole pattern, positioning the catheter at successive locations defined by the pattern, and drilling holes at the locations. Preferably, positioning comprises axially moving and rotating the catheter. Preferably, also, drilling comprises boring a hole and removing a plug from the catheter.

The invention and its particular features will become more apparent from the following detailed description when considered with reference to the accompanying drawings.

DETAILED DESCRIPTION

Figure 1:
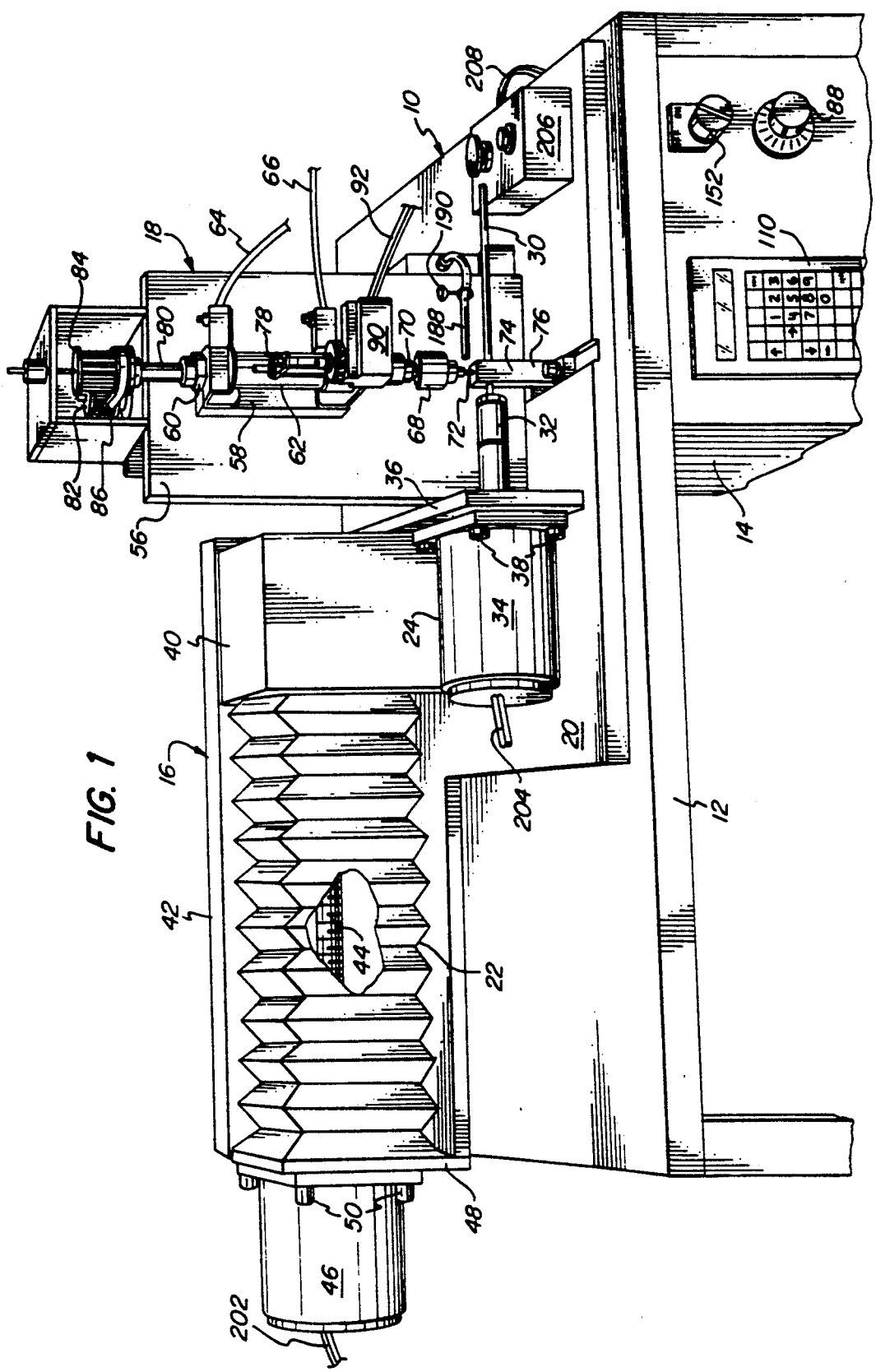
FIG. 1 is a front perspective view of an automated catheter side-drilling device in accordance with the invention.

A front perspective view of an automated side-drilling device for catheters 10 ("catheter driller") is shown in FIG. 1. Catheter driller 10 may conveniently be located on a work table 12 or the like to which a controller 14 may also be mounted. Catheter driller 10 generally comprises a positioning means or assembly 16 and a drilling means or assembly 18. Both drilling assembly 18 and positioning assembly 16 are attached to base 20 of catheter driller 10.

Positioning assembly 16 includes an axial moving assembly 22 and a rotating assembly 24. A catheter 30 is shown secured in a chuck 32 on the rotational axis of rotating assembly 24. Chuck 32 is designed to securely hold catheter 30 without causing impressions on or otherwise damaging the catheter. Chuck 32—and catheter 30—are preferably rotated or twisted by a stepping motor 34. Stepping motor 34 is located on the opposite end of rotating assembly 24 from chuck 32. Stepping motor 34 and attached chuck 32 are mounted to a mounting plate 36 by nuts or the like 38.

Mounting plate 36 is fixedly attached to a carriage 40 by means not shown, insuring that any movement of carriage 40 is translated to rotating assembly 24. In this regard, axial moving assembly 22 comprises a side wall 42 with which carriage 40 is slidingly engaged. Carriage 40 is further axially adjustably mounted on a screw 44. Screw 44 preferably lies on an axis parallel to that of rotating assembly 24. Carriage 40—and catheter 30—are preferably axially moved by a stepping motor 46 which is attached to and twists screw 44. Stepping motor 46 is mounted to an end wall 48 of axial moving assembly 22 by nuts or the like 50.

Positioning assembly 16 not only accomplishes quick and efficient rotational and axial alignment of catheter 30, but also provides precision rotational and axial alignment of the catheter. Stepping motor 34 is capable of controlling the rotation of catheter 30 to within about one degree and preferably to within about one four-hundredth of one rotation. Screw 44 is preferably provided with about five threads per inch so that one rotation of screw 44 advances carriage 40—and thus catheter 30—about one-fifth of an inch. Thus, since stepping motor 46 is preferably controllable to within about one four-hundredth of one rotation like stepping motor 34, the catheter can be axially advanced as little as one-half of one one-thousandth of an inch.

Drilling assembly 18 includes an upright 56 attached to base 20 by means not shown. Bracket 58, attached to upright 56, provides a mounting means along with bolt 60 for mounting a fluid, preferably air, cylinder 62. Fluid cylinder 62 is actuable, by ingress and egress of pressurized fluid along fluid lines 64 and 66, to raise and lower drill chuck 68.

Drill chuck 68 is attached to rod 70 of fluid cylinder 62 and securely receives any of a variety of drill bits 72. A removable replaceable stage 74 attached to base 20 by nut 76 is used in conjunction with drilling assembly 18 to side-drill catheters 30. The orientation and coordination of chuck 32, stage 74, drill bit 72 and catheter 30 are discussed in greater detail with reference to FIGS. 2–6. To prevent damage to either drill bit 72 or drill chuck 68, an adjustable mechanical stop 78 is provided.

Shaft 80 is energized to turn drill chuck 68 and drill bit 72 by a motor (not shown) located behind upright 56 which drives a sprocket 82 which in turn drives sprocket 84 via belt 86. The rotational speed of drill bit 72 is variably adjustable by knob 88 located on control box 14. In order to prevent damage to drill bit 72 or its energizing motor (not shown), a limiting switch 90 is provided to sense via line 92 when drill bit 72 is in its fully extended and fully retracted positions.

Figure 2:
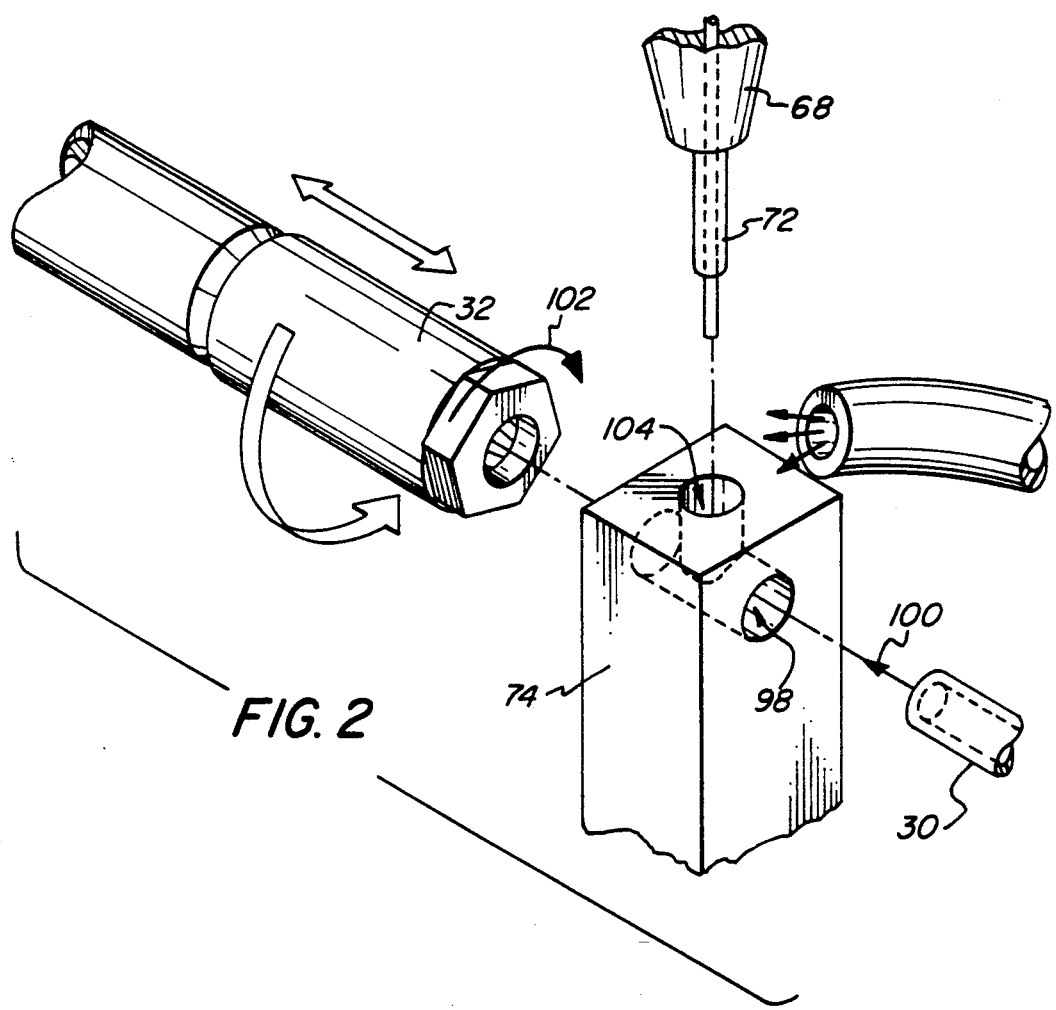
FIG. 2 is a partial enlarged front perspective view of the catheter side-drilling device of FIG. 1.

FIG. 2 is a partial enlarged front perspective view of catheter driller 10 illustrating the orientation of chuck 32, stage 74 and drill bit 72. For drilling, catheter 30 is placed through aperture 98 in stage 74 and into chuck 32 as indicated at arrow 100. Catheter 30 may then be secured within chuck 32 by twisting chuck 32 as indicated at arrow 102.

Stage 74 is preferably selected so that aperture 98 has a diameter which matches the outside diameter of catheter 30 so as to restrain its movement, thereby improving precision of placement of side-drilled holes. It is understood that catheters 30 come in a variety of inside and outside diameters, and thus stage 74 is relatively easily replaced to coordinate with any of a variety of catheter sizes.

Stage 74 has a second hole 104 for introduction of drill bit 72 to catheter 30. Hole 103 is preferably slightly larger than the diameter of drill bit 72. It is understood that drill bits 72 having a variety of diameters may be used to side drill catheters 30. And thus stage 74 is relatively easily replaceable to coordinate with any of a variety of drill bit sizes. Hole 104 may, although not shown, extend beyond catheter aperture 98 to permit drill bit 72 to side drill two holes in catheter 30 relatively simultaneously. Preferably, however, one hole is drilled at a time at each hole drilling location.

By properly matching aperture 98 and hole 104 of stage 74 with a given catheter 30 and drill bit 72 respectively, holes may be more precisely placed in catheter 30 and thus patterns of holes more precisely executed.

Securing catheter 30 within chuck 32 defines a home or initial position for purposes of side-drilling a pattern of holes in the catheter. A side-drilling hole pattern is preferably expressed as a series of hole-drilling locations defined by an axial displacement as indicated at arrow 106 and a rotational displacement as indicated at arrow 108. Preferably, successive hole drilling locations are expressed in terms of an axial move and rotation relative to a previous hole-drilling location or the home position. Returning briefly to FIG. 1, hole drilling patterns may be entered with keypad 110 for storage in controller 14.

Figure 3A:
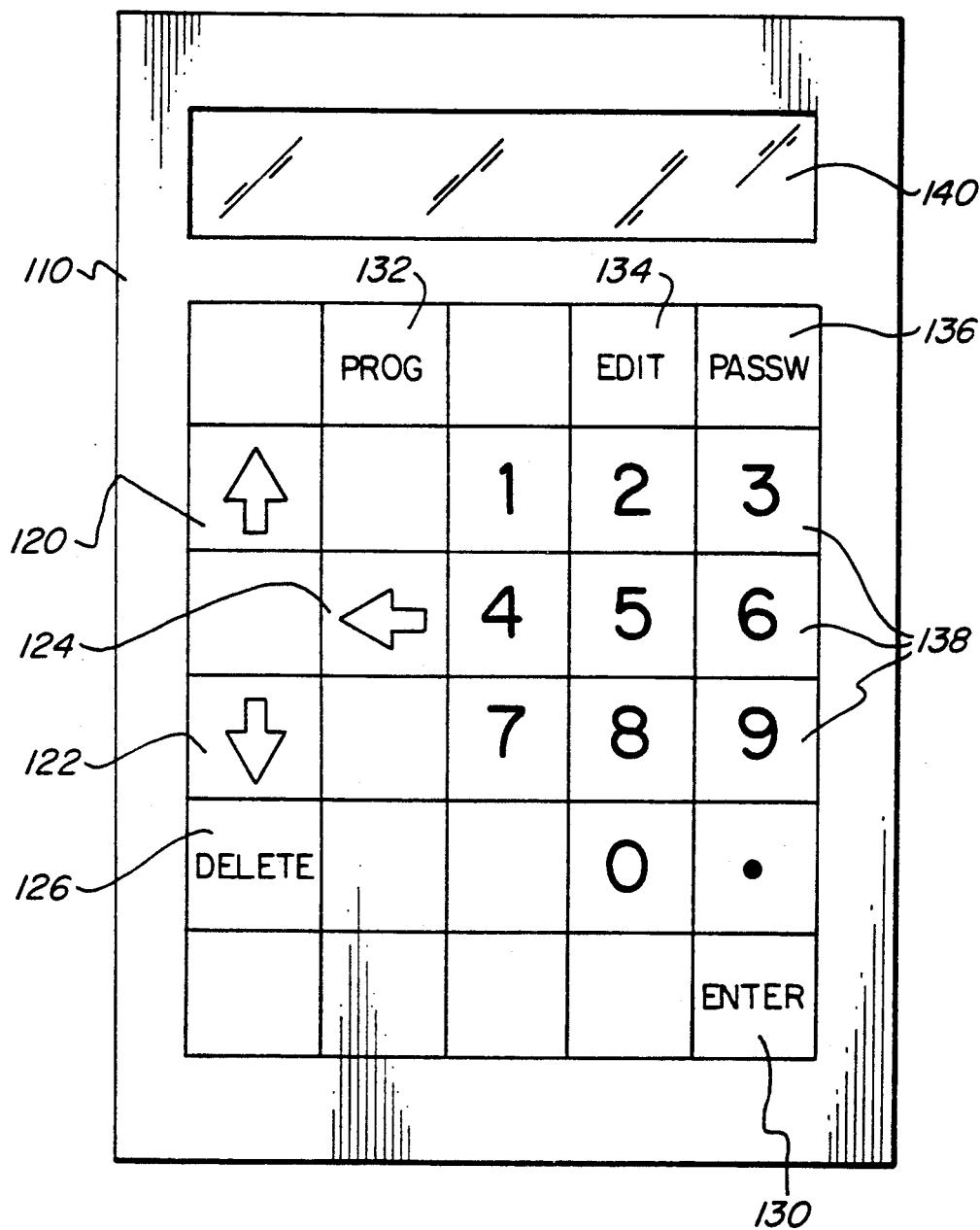
FIG. 3A is a schematic front view of a keypad of the side-drilling device of FIG. 1.
Figure 3B:
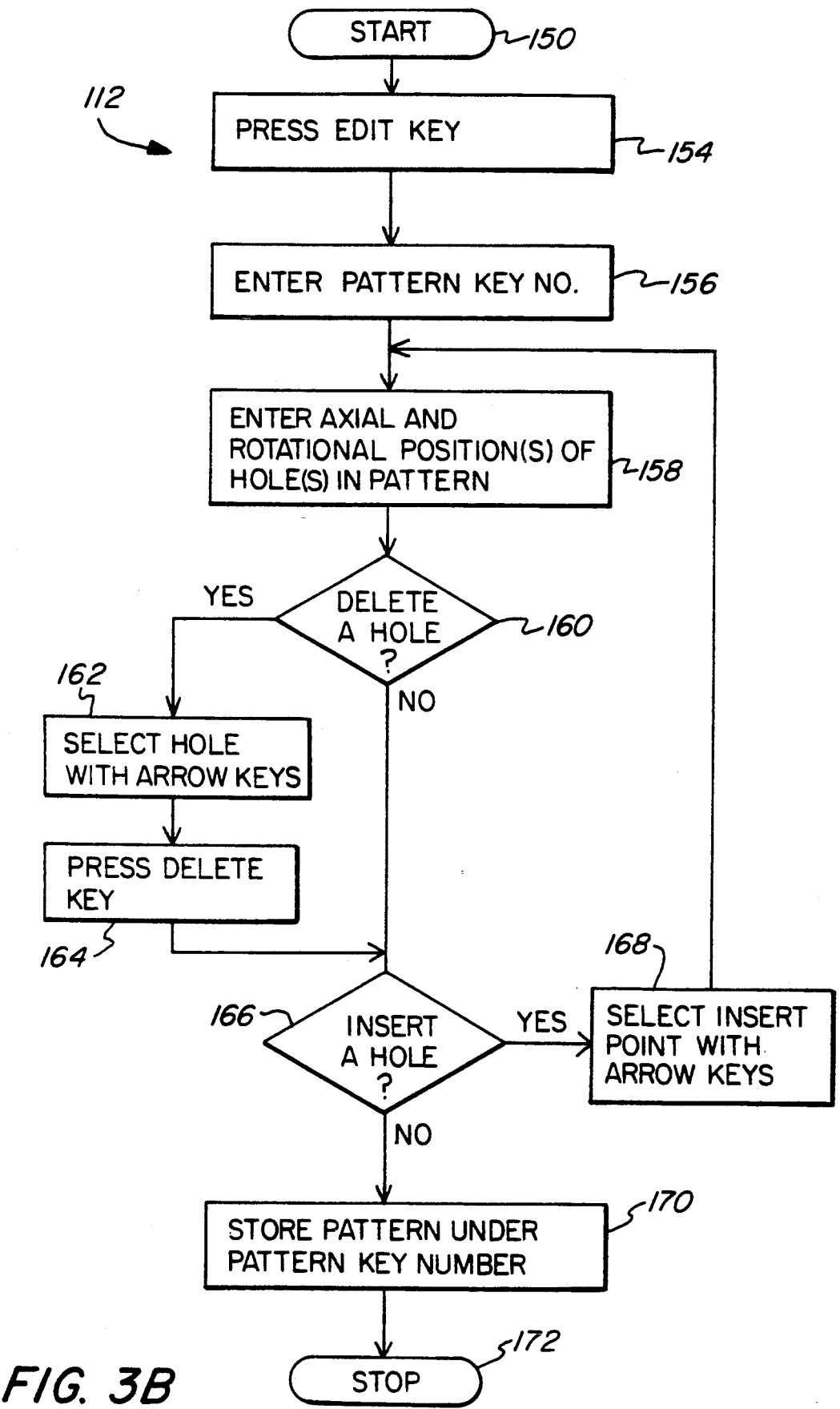
FIG. 3B is a flow diagram illustrating a method of inputting a side-drilling hole pattern to the device of FIG. 1.

The entry of hole drilling patterns is illustrated by FIGS. 3A and 3B. FIG. 3A is a schematic front view of keypad 110, and FIG. 3B is a flow diagram illustrating a method 112 of inputting a side-drilling hole pattern for storage in controller 14 of catheter driller 10.

Keypad 10 of FIG. 3A includes up arrow key 120, DELETE key 126, ENTER key 130, PROGram key 132, EDIT key 134, PASSWord key 136, and numeric keys 138. A display 140 is also provided to prompt users for appropriate input.

Method 112 of FIG. 3B starts at 150 by turning on controller 14 at ON/OFF switch 152 (see FIG. 1). Pressing EDIT key 134 at 154 will place controller 14 in input/edit mode for entry of side-drilling hole patterns. Display 140 will prompt for entry of a pattern or program key number and then entry of the pattern itself, both of which may be input with numeric keys 138 at 156. In response to prompts on display 140 for axial and rotational components, successive hole drilling locations are entered at 158 with numeric keys 138 and ENTER key 130. If a hole drilling location is to be deleted at 160, the hole to be deleted is selected at 162 with up and down arrow keys 120 and 122 and DELETE key 126 is pressed at 164. Once the deletion is complete or if no deletion is necessary, does a hole drilling location need to be added at 166? If so, the insertion point is selected at 168 with up and down arrow keys 120 and 122 and hole drilling locations are entered at 158. If no hole drilling locations need to be inserted at 166, then the side-drilling hole pattern or program is stored at 170 in controller 14, and method 112 stops at 172. Method 122 of side-drilling hole pattern entry is understood to be illustrative of many different software and hardware combinations which could be used.

Figure 4:
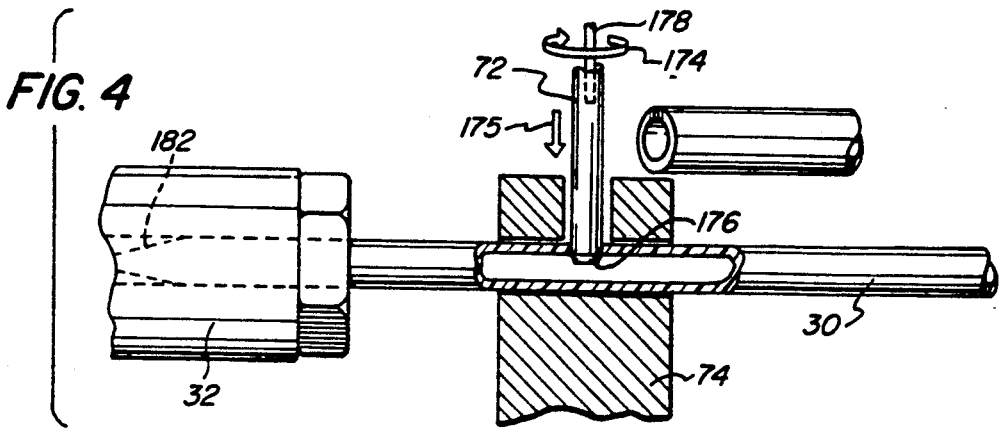
FIGS. 4–6 are partial enlarged front elevation views of the catheter side-drilling device of FIG. 1, partially cut away to reveal three steps in side-drilling.
Figure 5:
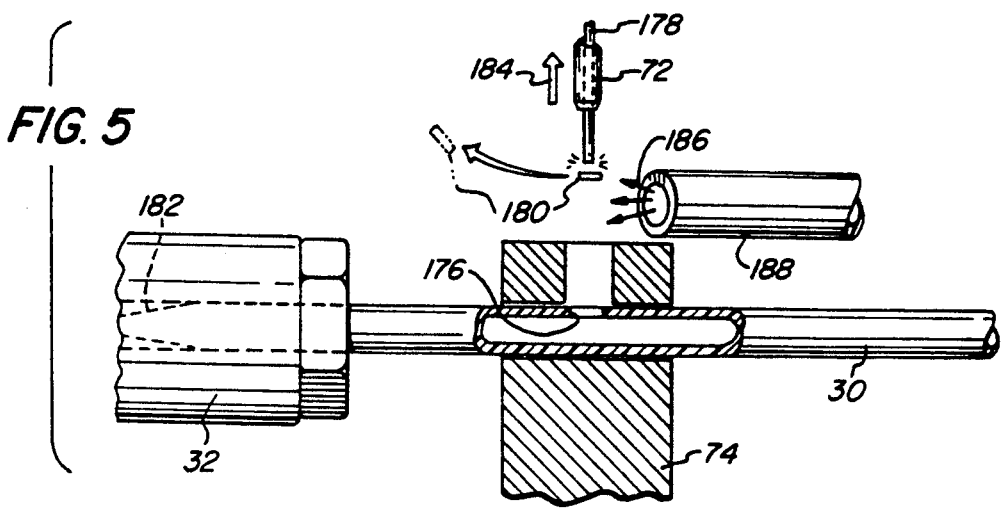
Figure 6:
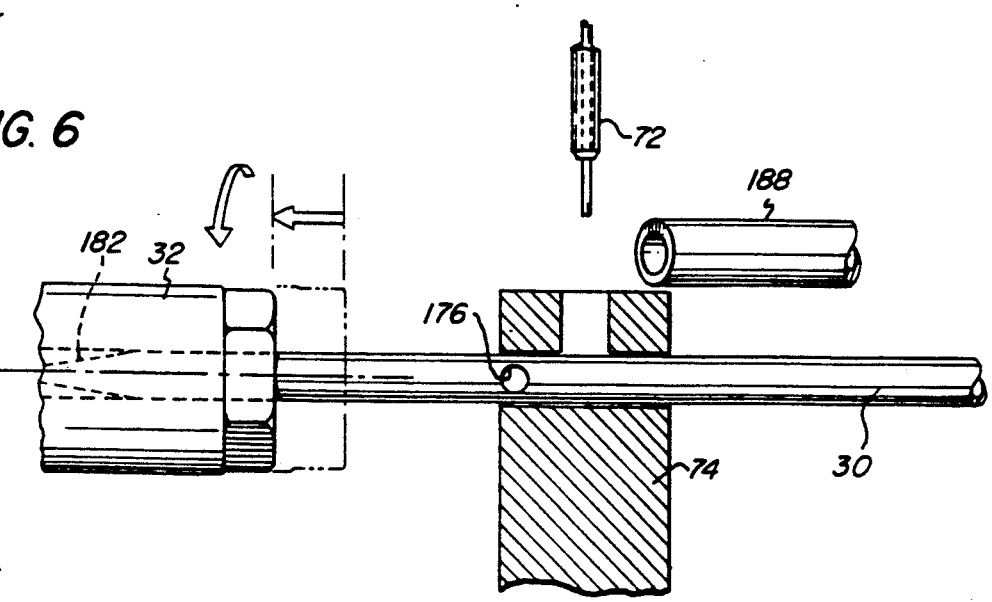

Referring now to FIGS. 4–6, partial enlarged front elevation views of catheter driller 10 are partially cut away to reveal three steps in side-drilling.

In FIG. 4, catheter 30 has previously been positioned at a first hole drilling location and drill bit 72 twisted as indicated at arrow 174 by a motor (not shown in any FIG.) and associated drive mechanisms 82, 84, 86, 80, 70 and 68 is lowered as indicated at arrow 175 by cylinder 62 and rod 70 (see FIG. 1) to bore a side hole 176 in catheter 30. Drill bit 72 is preferably hollow and twists around a stationary pin 178. In this regard, drill bit 72 slides over pin 178 like a sleeve, and provides a clean relatively flashless hole 176 in catheter 30 by boring a plug 180 therefrom.

In FIG. 5, hole 176 has been bored from catheter 176 and drill bit 72 has been retracted as indicated at arrow 184 by cylinder 62 and rod 70 (see FIG. 1) to slide up along stationary pin 178 which removes or pops plug 180 out from within drill bit 72. Popped-out plug 180 is then either blown away as shown by a flow of air 186 from air line 188, or sucked in by a vacuum on line 188. Returning briefly to FIG. 1, line 188 may be secured in an aligned position relative with stage 74 by a collar or the like 190 attached to upright 56.

Catheter 30 is shown having a preformed tip 182 indicated in dashed lines. Preferably, tip 182 is formed prior to side-drilling so as to prevent heat from the tipping process from distorting any holes in the catheter. It is understood, however, that tip 182 may be formed after side drilling as well.

In FIG. 6, hole 176 has been completed and positioning means 16 has positioned catheter 30 at another hole drilling location of a side-drilling hole pattern by rotating as indicated at arrow 192 with rotating assembly 24 and by axially moving as indicated at arrow 194 with axial moving assembly 22 (see FIG. 1). Catheter 30 is then ready to be side-drilled again as illustrated in FIGS. 4 and 5.

Positioning and drilling as illustrated in FIGS. 4-6 are repeated as many times as necessary to complete a side-drilling hole pattern. Controller 14 stores up to 50 different patterns each having up to 255 different hole drilling locations. To position catheter 30 and side-drill each hole takes less than two seconds for catheter driller 10, so that even the most complicated side-drilling patterns may be achieved in less than nine minutes. Additionally, because of the precision with which positioning and side-drilling are achieved, catheters can be duplicated with a high standard of repeatable accuracy. This is especially important for catheters used in delicate surgeries.

Figure 7:
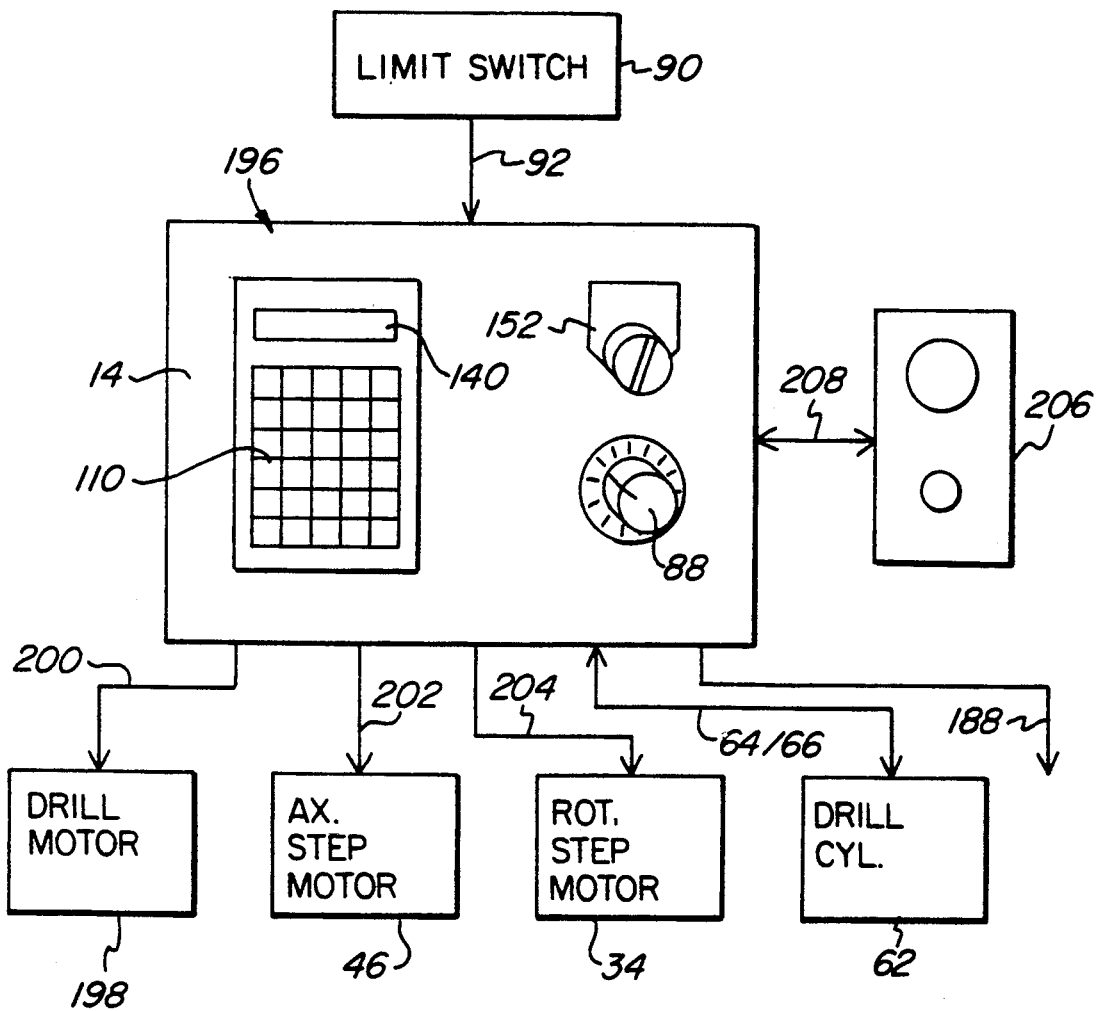
FIG. 7 is a block diagram illustrating the control mechanism for the catheter side-drilling device of FIG. 1.

Referring now to FIG. 7, a block diagram illustrates a control mechanism 196 for catheter driller 10. Controller 14 is preferably microprocessor-based and forms the heart of control mechanism 196 which also includes input keypad 110 having display 140, ON/OFF switch 152 and drill motor speed control knob 88. Knob 88 controls the speed of a drill motor (not shown in any FIG.) indicated at block 198 along line 200. Controller 14 also actuates axial stepping motor 46, rotational stepping motor 34, drill cylinder 62 along respective lines 202, 204 and 64/66, and air or vacuum line 188 which either blows away or sucks in plug 180 (see FIG. 5). A START/STOP switch 206 starts and stops side-drilling operations along line 208 (see FIG. 1).

Figure 8:
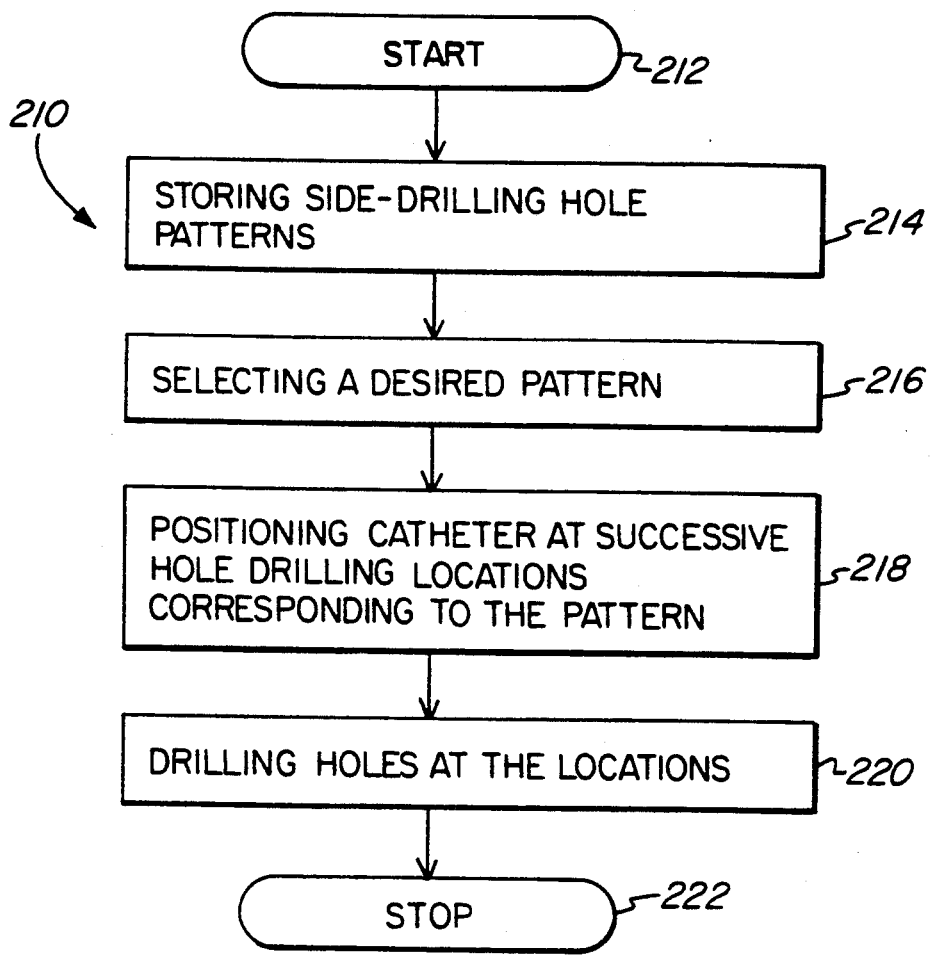
FIG. 8 is a flow diagram illustrating an automated method of side-drilling a catheter in accordance with the invention.

Referring now to FIG. 8, a flow diagram illustrates an automated method 210 for side-drilling of catheter 30 in accordance with the invention. Method 210 starts at 212 and side-drilling hole patterns are stored at 214 in controller 14. To initiate side-drilling, a desired pattern is selected at 216, preferably by using keypad 110 to input a key number or the like for the desired pattern. Next, at 218, catheter 30 is positioned at successive hole drilling locations corresponding to the selected side-drilling hole pattern. Holes are drilled at 220, preferably for each of the successive locations and method 210 stops at 222.

Figure 9:
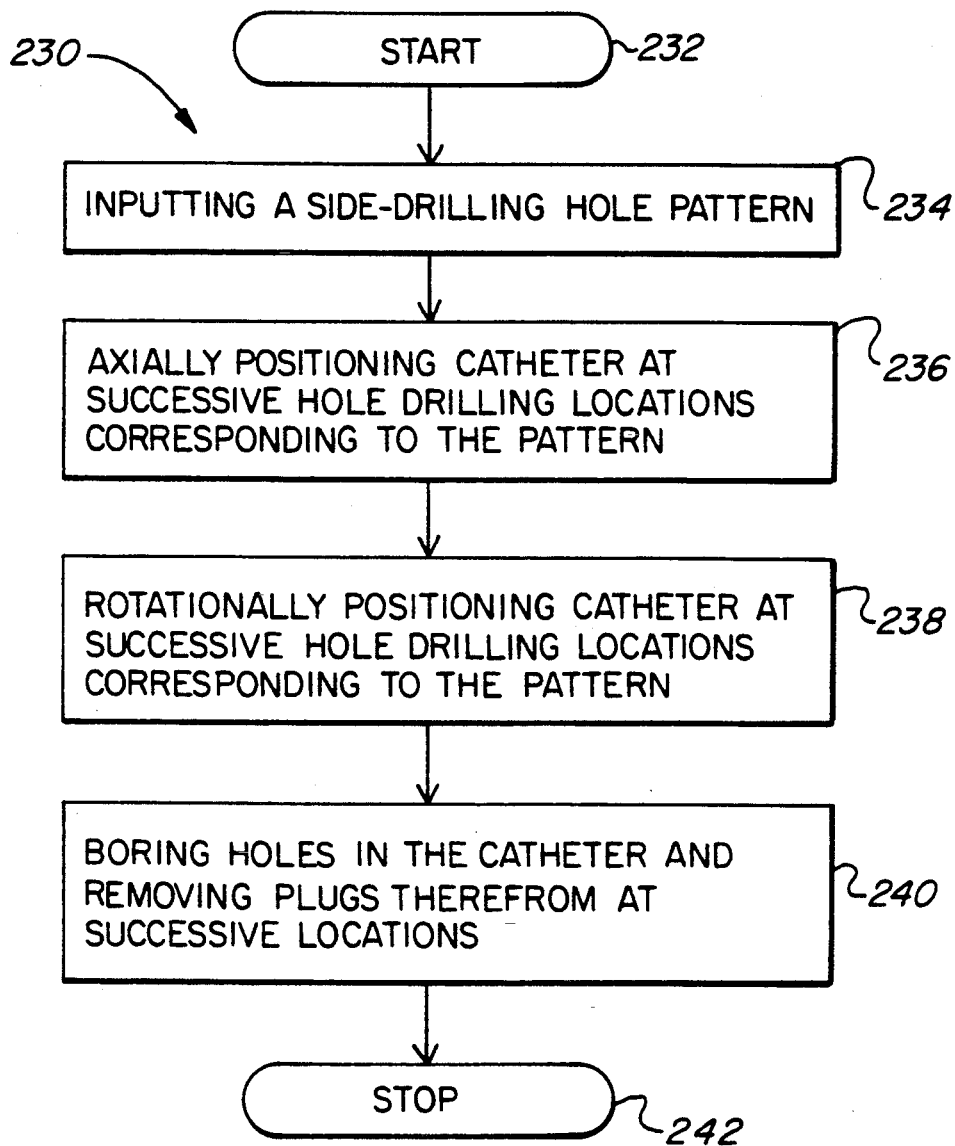
FIG. 9 is a flow diagram illustrating a method of side-drilling a catheter with the catheter side-drilling device of FIG. 1.

Referring now to FIG. 9, a flow diagram illustrates a method 230 for side-drilling catheter 30 with catheter driller 10. Method 230 starts at 232 and a side-drilling hole pattern or program is inputted at 234 for execution by controller 14. In accordance with the pattern, catheter 30 is axially positioned at 236 and rotationally positioned at 238 at successive hole drilling locations. Then, holes are bored in catheter 30 and plugs 180 are removed therefrom at 240 for successive hole drilling locations. Method 230 stops at 242.

Although the invention has been described with reference to particular embodiments, features, materials of construction and the like, these are not intended to exhaust all possible features, and indeed many other modifications and variations will be ascertainable to those of skill in the art.

What is claimed is:

1. A device for automated side-drilling of a catheter comprising:
   means for storing side-drilling hole patterns;
   means for selecting a desired side-drilling hole pattern;
   means for positioning the catheter at successive hole drilling locations;
   means for drilling holes in a side of the catheter; and
   control means responsive to a selected side-drilling hole pattern for actuating said positioning means and said drilling means to side-drill holes in the catheter at successive hole drilling locations corresponding to the selected side-drilling hole pattern;
   said drilling means including a hollow drill bit which bores a plug out of the catheter, said hollow drill bit axially slidable over a stationary plug removal pin located therein.

2. The device of claim 1 wherein said positioning means comprises:
   means for axially moving the catheter to within about one one-hundredth of an inch precision; and
   means for rotating the catheter to within about one degree precision.

3. The device of claim 2 wherein said rotating means comprises a stepping motor.

4. The device of claim 2 wherein said axial moving means comprises:
   a screw;
   a stepping motor for twisting the screw; and
   a carriage axially adjustably mounted to the screw such that twisting the screw axially moves said carriage, said carriage having said rotating means mounted thereon.

5. The device of claim 1 wherein said selecting means comprises a keypad.

6. The device of claim 5 wherein said keypad may be used to input a plurality of side-drilling hole patterns to said storing means.

7. The device of claim 1 comprising vacuum means for sucking up plugs removed by said plug removal pin.

8. The device of claim 1 comprising compressed air means for blowing plugs removed by said plug removal pin away from the catheter.

9. The device of claim 1 wherein said drilling means comprises a fluid cylinder for advancing said hollow drill bit a distance into the catheter.

10. The device of claim 9 wherein said fluid cylinder comprises means for adjusting the distance said hollow drill bit is advanced into the catheter.

11. A device for side-drilling a catheter comprising:
    means for inputting a side-drilling hole pattern;
    means for axially positioning the catheter at successive hole drilling locations corresponding to the side-drilling hole pattern;
    means for rotationally positioning the catheter at successive hole drilling locations corresponding to the side-drilling hole pattern;
    a hollow drill bit which removes plugs from the catheter at successive hole drilling locations corresponding to the side-drilling hole pattern; and
    control means responsive to the side-drilling hole-pattern for actuating said axial positioning means, said rotational positioning means and said hollow drill bit.

12. The device of claim 11 wherein said rotational positioning means comprises a stepping motor.

13. The device of claim 11 wherein said axial positioning means comprises:
    a screw;
    a stepping motor for twisting the screw; and
    a carriage axially adjustably mounted to the screw such that twisting the screw axially moves said carriage, said carriage having said rotational positioning means mounted thereon.

14. The device of claim 11 wherein said hollow drill bit is axially slidable over a stationary plug removal pin located therein.

15. A method for automated side-drilling of a catheter comprising:
   storing side-drilling hole patterns;
   selecting a desired side-drilling hole pattern;
   positioning the catheter at successive hole drilling locations corresponding to the selected side-drilling hole pattern; and
   drilling holes in the catheter at the successive locations.

16. The method of claim 15 wherein positioning comprises:
   axially moving the catheter to within about one one-hundredth of an inch precision; and
   rotating the catheter to within about one degree precision.

17. The method of claim 15 wherein drilling comprises boring and removing a plug from the catheter.

18. The method of claim 17 wherein drilling further comprises vacuuming the plug away from the catheter.

19. The method of claim 17 wherein drilling further comprises blowing the plug away from the catheter.

20. A method for side-drilling a catheter comprising:
   inputting a side-drilling hole pattern;
   axially moving the catheter to successive hole drilling locations corresponding to the side-drilling hole pattern;
   rotating the catheter to successive hole drilling locations corresponding to the side-drilling hole pattern; and
   boring holes in the catheter and removing a plug therefrom at the successive locations.

* * * * *